United States Patent
Lindoff et al.

(10) Patent No.: US 9,030,982 B2
(45) Date of Patent: May 12, 2015

(54) METHOD AND ARRANGEMENT FOR A TERMINAL OF A WIRELESS COMMUNICATION NETWORK

(75) Inventors: Bengt Lindoff, Bjärred (SE); Muhammad Kazmi, Bromma (SE); Ylva Jading, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 300 days.

(21) Appl. No.: 13/516,730

(22) PCT Filed: Dec. 16, 2010

(86) PCT No.: PCT/EP2010/069877
§ 371 (c)(1),
(2), (4) Date: Jul. 26, 2012

(87) PCT Pub. No.: WO2011/076658
PCT Pub. Date: Jun. 30, 2011

(65) Prior Publication Data
US 2012/0281607 A1    Nov. 8, 2012

Related U.S. Application Data

(60) Provisional application No. 61/297,323, filed on Jan. 22, 2010.

(30) Foreign Application Priority Data

Dec. 22, 2009   (EP) .................................... 09180303

(51) Int. Cl.
*G08C 17/00* (2006.01)
*H04W 48/08* (2009.01)
*H04W 52/02* (2009.01)

(52) U.S. Cl.
CPC .......... *H04W 48/08* (2013.01); *H04W 52/0216* (2013.01)

(58) Field of Classification Search
CPC .. H04W 48/00–48/20; H04W 52/02–52/0296; H04W 74/002–74/008
USPC ................ 370/311, 328; 455/436, 446, 562.1
See application file for complete search history.

(56) References Cited

U.S. PATENT DOCUMENTS

2003/0112744 A1*  6/2003  Baum et al. ................... 370/206
2004/0002333 A1   1/2004  Neufeld
(Continued)

FOREIGN PATENT DOCUMENTS

| CN | 101584128 A | 11/2009 |
|---|---|---|
| JP | 2007 089227 A | 4/2007 |
| WO | 2009/140988 A1 | 11/2009 |

OTHER PUBLICATIONS

PCT International Preliminary Report on Patentability, mailed Jul. 5, 2012, in connection with International Application No. PCT/EP2010/069877.

(Continued)

*Primary Examiner* — Ricky Ngo
*Assistant Examiner* — Kabir Jahangir
(74) *Attorney, Agent, or Firm* — Leffler Intellectual Property Law, PLLC

(57) ABSTRACT

A method of operating a terminal of a wireless communication network is disclosed, wherein the terminal operates according to a discontinuous reception mode. The wireless communication network comprises one or more wireless network nodes having at least first and second downlink transmission modes, the first downlink transmission mode comprising normal operation of a particular network node and the second downlink transmission mode comprising restricted downlink transmission of the particular network node and being applicable when the number of active terminals in the cell associated with the particular network node is less than or equal to a second mode threshold value. The method comprises detecting a cell identity for a cell associated with a wireless network node of the wireless communication system, determining a current downlink transmission mode of the wireless network node as the first or second downlink transmission mode, and adapting a time pattern based on the determined current downlink transmission mode, wherein the time pattern specifies when a receiver of the terminal is turned on. Corresponding computer program product and arrangement are also disclosed.

16 Claims, 2 Drawing Sheets

(56) References Cited

U.S. PATENT DOCUMENTS

| | | | |
|---|---|---|---|
| 2004/0047328 A1* | 3/2004 | Proctor et al. | 370/342 |
| 2005/0176468 A1* | 8/2005 | Iacono et al. | 455/562.1 |
| 2008/0101268 A1* | 5/2008 | Sammour et al. | 370/311 |
| 2008/0108368 A1* | 5/2008 | Yi et al. | 455/452.2 |
| 2008/0151797 A1 | 6/2008 | Camp, Jr. | |
| 2009/0034452 A1* | 2/2009 | Somasundaram et al. | 370/328 |
| 2009/0181676 A1* | 7/2009 | Lee et al. | 455/436 |
| 2009/0285141 A1* | 11/2009 | Cai et al. | 370/311 |
| 2010/0323633 A1* | 12/2010 | Pani et al. | 455/67.14 |
| 2011/0026484 A1* | 2/2011 | Fox et al. | 370/331 |
| 2011/0051640 A1* | 3/2011 | Ramesh et al. | 370/311 |
| 2012/0307732 A1* | 12/2012 | Olsson et al. | 370/328 |
| 2013/0155981 A1* | 6/2013 | Kitazoe | 370/329 |

OTHER PUBLICATIONS

PCT International Search Report, mailed Jan. 25, 2011, in connection with International Application No. PCT/EP2010/069877.

PCT Written Opinion, mailed Jan. 25, 2011, in connection with International Application No. PCT/EP2010/069877.

3GPP TS 36.133, V9.1.0 Technical Specification Group Radio Access Network; Evolved Universal Terrestrial Radio Access (E-UTRA); Requirements for support of radio resource management (Release 9), Sep. 2009.

3GPP TS 36.214, V9.0.0 Technical Specification Group Radio Access Network; Evolved Universal Terrestrial Radio Access (E-UTRA); Physical layer—Measurements (Release 9), Dec. 2009.

3GPP TS 36.331, V9.0.0 Technical Specification Group Radio Access Network; Evolved Universal Terrestrial Radio Access (E-UTRA) Radio Resource Control (RRC); Protocol specification (Release 9), Sep. 2009.

Chinese Search Report, dated Jul. 25, 2014, in connection with counterpart Chinese Patent Application No. 201080058622.X, all pages.

* cited by examiner

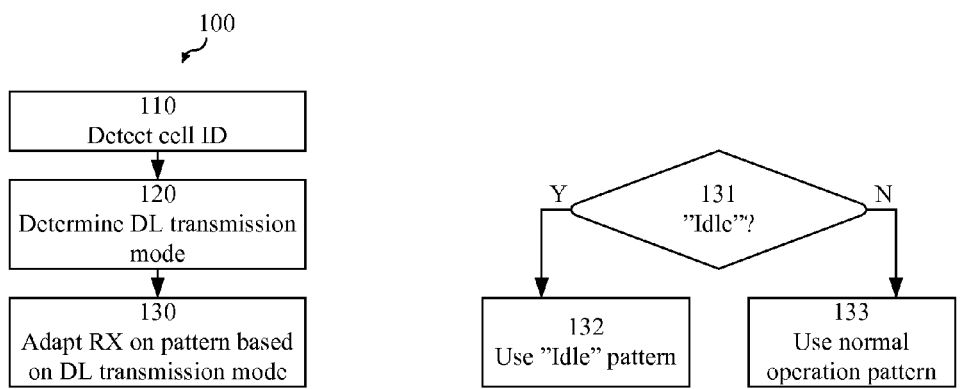
Fig. 1A                      Fig. 1B
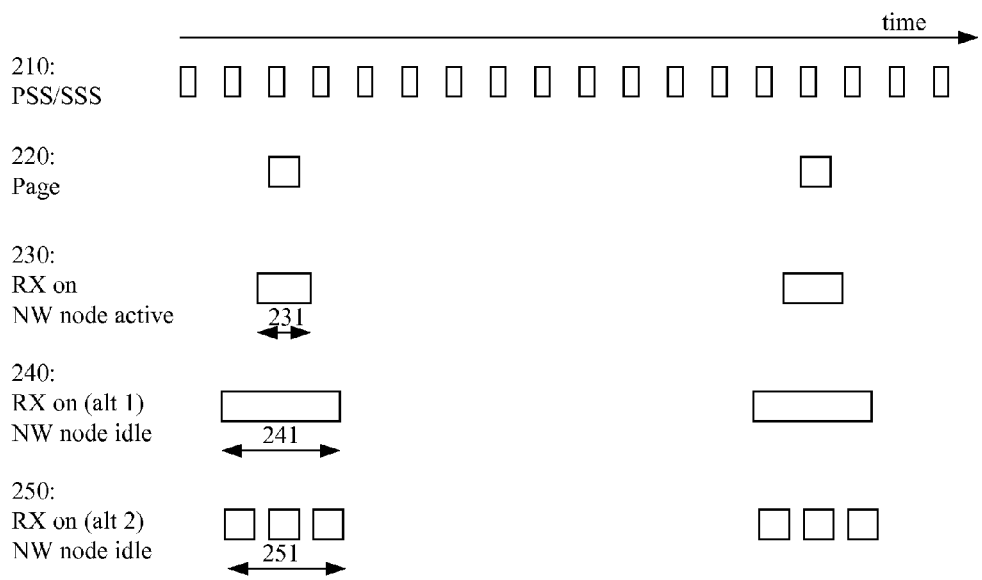
Fig. 2

METHOD AND ARRANGEMENT FOR A TERMINAL OF A WIRELESS COMMUNICATION NETWORK

CROSS-REFERENCE TO RELATED APPLICATIONS

This application claims priority under 35 U.S.C. §119 to European Patent Application No. 09180303.1, filed Dec. 22, 2009, which is hereby incorporated herein by reference in its entirety. This application also claims the benefit of U.S. Provisional Application No. 61/297,323, filed Jan. 22, 2010, which is hereby incorporated herein by reference in its entirety.

TECHNICAL FIELD

The present invention relates generally to the field of operating terminals in a wireless communication network having network nodes with two operation modes, such as a high activity mode and a low activity mode.

BACKGROUND

Energy consumption has always been and still is an important issue for mobile terminals of wireless communication systems such as cellular systems. Recently, trends in environmental friendly technology make it important to reduce the energy consumption also for the network nodes (e.g. base stations—BS, NodeB, eNodeB, etc). Unlike terminals, which have possibilities to go into idle (or sleep) mode once they are not active, a network node needs to always transmit some signals (e.g. pilots, synchronization symbols and broadcast messages) so that camping terminals may stay in synchronization (in sync) with the network.

In an example scenario, when a network node serves a cell with many active terminals and some idle terminals, the network node may need to continuously transmit pilots, synchronization signals, etc, in order to maintain connection to the terminals. However, in an alternative scenario, when a network node serves a cell where all terminals are in an idle state (or in an active state with very low activity), the situation is somewhat different. In such scenarios, the terminals do not receive any data (or only a very small amount of data). The terminals only need to do mobility measurements (such as measurements for cell reselection or handover) and listen to paging messages. In such scenarios, a network node which is transmitting according to its conventional transmission scheme will waste a lot of energy.

Proposals considering an ability to put network nodes with a low load (e.g. serving no or few active terminals) into an "idle" state have been discussed.

An "idle" state (or energy saving mode) of a network node may be applicable when there are no active terminals in a cell associated with the network node. Alternatively or additionally, the "idle" state of a network node may be applicable when the number of active terminals in the cell are less than or equal to a threshold.

In the same manner a normal operation mode of a network node may be applicable when there is at least one active terminal in a cell associated with the network node. Alternatively or additionally, the normal operation mode may be applicable when the number of active terminals in the cell is greater than a threshold (which may or may not be the same as the threshold for the "idle" state).

Generally, the "idle" state may comprise restricted downlink transmissions. For example, some signals may be transmitted intermittently instead of continuously, and/or some signals may be transmitted using only part of the cell transmission bandwidth, and/or some signals may not be transmitted at all.

An example of a network node "idle" state may be a low activity mode of the network node comprising restricted or reduced downlink transmissions. One possible approach might be to reduce the amount of transmitted signals or channels to an absolute minimum. There are numerous possible ways to achieve a low activity mode of a network node, and the possibilities may vary depending on the access technology under consideration. Definitions and particulars of a network node "idle" state may be specified in standardization documentation for the applicable standards. Low activity state, low transmission state, restricted state, and restricted transmission state are other examples of possible terminologies that may be used for the idle state. The skilled person recognizes that all of these terms may have similar or the same meaning. Hereinafter, the terms idle state, energy saving mode and low activity mode will be used. A few examples of approaches that are applicable to UMTS LTE (Universal Mobile Telecommunication Standard Long Term Evolution, Release 9, 10 and onwards; E-UTRAN—Evolved UMTS Terrestrial Radio Access Network) are given in the following. It should be noted however, that these are merely examples and by no way limiting to the invention.

In UMTS LTE it may be sufficient for a NodeB in the "idle" state to transmit only synchronization signals (PSS—Primary Synchronization Sequence/SSS—Secondary Synchronization Sequence) and physical broadcast information (P-BCH—Physical Broadcast CHannel) together with pilot symbols (also denoted reference signals and used for e.g. channel estimation) in association with the P-BCH transmission. These signals are transmitted in well defined OFDM symbols in sub-frames 0 and 5 in both FDD (Frequency Division Duplex) and TDD (Time Division Duplex). If such an approach is used, the NodeB can reduce its duty cycle significantly and basically transmit information only in a few OFDM symbols of the sub-frames 0 and 5.

If more limited pilot (or reference) signals are transmitted in the energy saving mode (e.g. only in sub-frames 0 and 5, and only over 6 central resource blocks, then a terminal may perform measurements over a smaller bandwidth than when the network node is in non-energy saving mode.

In another approach that further reduces the amount of transmissions in UMTS LTE, only the synchronization signals (PSS/SSS) are transmitted by the network node when it is in the "idle" state. As in the previous example above these signals are transmitted in sub-frames 0 and 5. The transmission takes place over 6 central resource blocks regardless of the actual cell transmission bandwidth (i.e. the bandwidth in the active state).

A problem that arises when reducing the number of pilots is that the terminal needs to rely on fewer symbols for keeping in sync with the network node.

Another problem that arises is that the operations of a terminal (e.g. measurements, paging listening, etc) designed to work well when the corresponding network node is in a normal operation mode may not be optimal when the corresponding network node is in the "idle" state.

Thus, there is a need for methods and arrangements for operating a terminal in a wireless communication network having network nodes with two operational modes, e.g. a high activity mode (conventional operation) and a low activity mode ("idle" state).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements for operating a terminal in a wireless communication network having network nodes with two operational modes.

The two operational modes may be operable to set the entire network node operation into a high activity operational mode or a low activity operational mode. It should be noted, however, that the two operational modes may alternatively or additionally be applicable on cell level (in the case when a network node serves several cells) and/or on carrier level (in the case when a network node or cell applies more than one carriers). Thus, to give an example, the same network node may simultaneously serve one of its cells in a low activity mode and another one of its cells in high activity mode.

According to a first aspect of the invention, this is achieved by a method of operating a terminal of a wireless communication network, wherein the terminal operates according to a discontinuous reception mode. The wireless communication network comprises one or more wireless network nodes having at least first and second downlink transmission modes. The first downlink transmission mode comprises normal operation of a particular network node and is applicable when a number of active terminals in a cell associated with the particular network node is greater than a first mode threshold value. The second downlink transmission mode comprises restricted downlink transmission of the particular network node and is applicable when the number of active terminals in the cell associated with the particular network node is less than or equal to a second mode threshold value. The restricted downlink transmission comprises information that assists active terminals not served by the cell in finding the cell and/or non-active terminals camping on the cell to stay in synchronization with the wireless communication network. The method comprises detecting a cell identity for a cell associated with a wireless network node of the wireless communication system, determining a current downlink transmission mode of the wireless network node as the first or second downlink transmission mode, and adapting a time pattern based on the determined current downlink transmission mode, wherein the time pattern specifies when a receiver of the terminal is turned on.

In some embodiments, the step of adapting the time pattern based on the determined current downlink transmission mode may comprise using, for the first downlink transmission mode, a periodically repeated first continuous receiver on period comprising a paging period if the terminal is in an idle mode and a reception period if the terminal is in an active mode. The length of the first continuous receiver on period may be smaller than a first period length threshold value.

The step of adapting the time pattern based on the determined current downlink transmission mode may further comprise using, for the second downlink transmission mode, a periodically repeated second continuous receiver on period comprising the paging period if the terminal is in an idle mode and a reception period if the terminal is in an active mode. The length of the second continuous receiver on period may be larger than a second period length threshold value.

The step of adapting the time pattern based on the determined current downlink transmission mode may (additionally or alternatively) further comprise using, for the second downlink transmission mode, a periodically repeated discontinuous receiver on pattern having a specific duration. The length of the specific duration may be larger than a second period length threshold value, and the discontinuous receiver on pattern may comprise a receiver on period comprising the paging period if the terminal is in an idle mode and a reception period if the terminal is in an active mode.

In some embodiments, the second period length threshold value may be larger than or equal to the first period length threshold value.

The step of determining the current downlink transmission mode may comprise receiving an indication of the current downlink transmission mode from the wireless communication network.

Alternatively or additionally, the step of determining the current downlink transmission mode may comprise blindly detecting the current downlink transmission mode.

The second operation mode may comprise transmission of a synchronization signal and the time pattern may be suitable for using the synchronization signal for at least one of: monitoring a quality of a downlink radio link, automatic frequency control, mobility measurements, positioning measurements for determination of terminal location, time synchronization, and frequency synchronization.

In some embodiments, the second operation mode may comprise intermittent downlink transmission of the particular network node.

The first and/or second mode threshold value may equal zero according to some embodiments.

The time pattern may be terminal specific or predefined. In some embodiments, at least one of the time patterns and an identifier of a predefined time pattern may be signaled by the network node.

A second aspect of the invention is a computer program product comprising a computer readable medium, having thereon a computer program comprising program instructions, the computer program being loadable into a data-processing unit and adapted to cause the data-processing unit to execute method steps according to the first aspect of the invention when the computer program is run by the data-processing unit.

A third aspect of the invention is an arrangement for a terminal of a wireless communication network, wherein the terminal operates according to a discontinuous reception mode and wherein the wireless communication network comprises one or more wireless network nodes having at least first and second downlink transmission modes. The first downlink transmission mode comprises normal operation of a particular network node and is applicable when a number of active terminals in a cell associated with the particular network node is greater than a first mode threshold value. The second downlink transmission mode comprises restricted downlink transmission of the particular network node and is applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network. The arrangement comprises a cell identity detector arranged to detect a cell identity for a cell associated with a wireless network node of the wireless communication system, a transmission mode determiner arranged to determine a current downlink transmission mode of the wireless network node as the first or second downlink transmission mode, and a controller arranged to adapt a time pattern based on the determined current downlink transmission mode, wherein the time pattern specifies when a receiver of the terminal is turned on.

In some embodiments, the arrangement may further comprise a receiver arranged to receive an indication of the current downlink transmission mode from the wireless communication network.

A fourth aspect of the invention is a communication device comprising the arrangement according the third aspect of the invention.

In some embodiments, the second, third and fourth aspects of the invention may additionally have features identical with or corresponding to any of the various features as explained above for the first aspect of the invention.

An advantage of some embodiments of the invention is that the terminal may adapt when its receiver is turned on according to the current operational mode of the network node.

Another advantage of some embodiments of the invention is that the terminal behavior (in terms of robustness, performance and/or power consumption) may be improved compared to if no adaptation was possible.

BRIEF DESCRIPTION OF THE DRAWINGS

Further objects, features and advantages of the invention will appear from the following detailed description of embodiments of the invention, with reference being made to the accompanying drawings, in which:

FIGS. 1A-B are flowcharts illustrating example method steps according to some embodiments of the invention;

FIG. 2 is a schematic diagram illustrating example time periods according to some embodiments of the invention;

DETAILED DESCRIPTION

Figure 3:
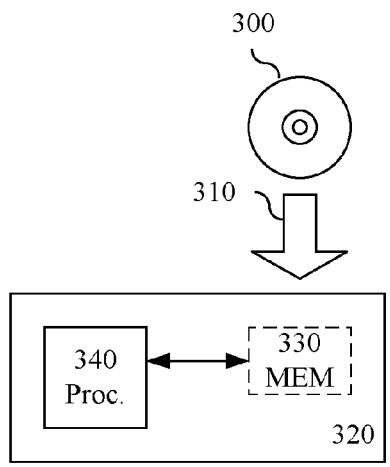
FIG. 3 is a schematic diagram illustrating a computer program product according to some embodiments of the invention.

In the following, embodiments of the invention will be described where a terminal adapts its operation based on a determination of a current operational mode of a network node. More particularly, in embodiments of the invention the terminal adapts a time period and/or a time pattern that define when a receiver of the terminal is turned on based on the determination.

Embodiments of the invention enable the terminal to optimize its power consumption based on the current mode of one or more network nodes, while being able to guarantee that a required performance is met.

The description of embodiments of the invention will focus on UMTS LTE: However, it is to be understood that the invention is not limited to application is such systems. Furthermore, the term NodeB is used in the description, but this is in no way to be construed as limiting. Contrarily, embodiments of the invention are equally applicable in the context of any type of network node, such as any base station (eNodeB, femto cell, home base station, home eNodeB, home NodeB) or any radio network node having base station functionalities and capabilities.

First, a general description of example network signaling and some example tasks that may need to be performed by a terminal (or is desirable that a terminal performs) in a wireless communication network is given.

In order for a terminal to detect a cell and keep itself in synchronization with the network, a number of physical signals typically need to be transmitted by the network. In general, the terminal needs some type of synchronization signal(s) to synchronize itself with the system (e.g. P-SCH (Primary Synchronization CHannel) termed PSS (Primary Synchronization Sequence) and S-SCH (Secondary Synchronization CHannel) termed SSS (Secondary Synchronization Sequence) in UMTS and UMTS LTE).

Furthermore, some kind of reference symbols or pilot signals are typically required (e.g. CPICH (Common PIlot CHannel) in UMTS and RS (Reference Symbols) in UMTS LTE). These signals may be used to measure the signal strength and/or signal quality of a cell. They may also be used to estimate the radio channel used for data demodulation. In UMTS LTE FDD, RS typically used for measurements are transmitted in sub-frames $0, 4, 5, 9$, from antenna port $0$, and in the central 6 resource blocks. The cell might also need to transmit broadcast information in order for a terminal to know various parameters (e.g. needed for setting up a connection). Depending on the cellular system, such information is transmitted on different physical channels. In UMTS LTE, broadcast information is sent via the physical broadcast channel (PBCH) and the physical downlink shared channel (PDSCH). The PBCH is transmitted in sub-frame $0$ and contains the master information block (MIB), which carries important information such as cell bandwidth, one or more antenna ports, system frame number (SFN), etc. Other, more detailed, information may be transmitted via one or more of several system information blocks (SIB), which are mapped on PDSCH and transmitted in sub-frame $5$ in UMTS LTE. In UMTS, there is only one broadcast channel, which contains both MIB and SIBs.

Thus, in UMTS LTE, the PSS/SSS and the broadcast channel (BCH) are used for the above purposes. It is noted, however, that some carriers may carry PSS/SSS but no BCH. It is also noted that other systems may employ other setups.

Information like the one described above (synchronization signals, reference signal, broadcast information) are commonly denoted Necessary Cell Identity Information (NCII), and is an example of information that may be transmitted by a network node in energy saving mode.

One example task to be performed by a terminal is performing mobility measurements. Depending on the current mode of the terminal, the terminal may perform any of two types of mobility, namely idle mode mobility (e.g. for cell reselection purposes) or connected mode mobility (e.g. for handover purposes).

In most applications, the cell reselection is a mainly terminal autonomous function without any direct intervention of the network. However, the terminal behaviour in this mobility scenario could—to some extent—be controlled by broadcasted system parameters and by performance specification. The handover, on the other hand, is in general fully controlled by the network through explicit terminal specific commands and by performance specification.

For both idle mode and connected mode, mobility decisions may mainly be based on downlink neighbor cell measurements (which may be of the same or different type for the two terminal operational modes).

For example, in UMTS LTE (E-UTRAN—Evolved UMTS Terrestrial Radio Access Network) the following downlink neighbor cell measurements (measured for serving and neighboring cells) are specified primarily for mobility purpose (see the specification document 3GPP TS 36.214, "Evolved Universal Terrestrial Radio Access (E UTRA); Physical layer measurements"):

Reference symbol received power (RSRP), which is signal strength measurement, and Reference symbol received quality (RSRQ), which is signal quality measurement (RSRQ=RSRP/carrier RSSI (Received Signal Strength Indication)).

Another example task for the terminal concerns radio link monitoring. In general, the radio link monitoring (RLM) procedure enables the terminal to detect whether it is out of sync or in sync with the serving cell.

The procedure may be used when the terminal is in RRC (Radio Resource Control) connected mode. In UMTS LTE, the RLM procedure and the corresponding requirements are specified in the specification documents 3GPP TS 36.331, "Evolved Universal Terrestrial Radio Access (E UTRA); Radio Resource Control (RRC); Protocol specification" and 3GPP TS 36.133, "Evolved Universal Terrestrial Radio Access (E UTRA); Requirements for support of radio resource management".

In some applications of UMTS LTE, the terminal measures the serving cell downlink quality based on a common reference signal to determine whether it is out of sync or in sync with the serving cell. After N successive out of sync determinations have been registered (where N is a network configured parameter), a radio link failure (RLF) procedure may be initiated. Upon completion of the RLF procedure, the terminal typically turns off its transmitter and may attempt to establish (or re-establish) a connection to the most suitable cell (e.g. the cell with the strongest measured signal).

In both UMTS and UMTS LTE, a DRX (discontinuous reception) operation is applicable to a terminal in both idle and active (connected) mode. The DRX mode is in fact an energy saving mode of the terminal. In UMTS LTE, the DRX cycles for active mode ranges from 10 ms to 2560 ms, and the network determines which DRX cycle is to be configured. In typical deployment scenario, the network may use DRX for a terminal in both idle and active modes.

Regardless of whether the cell is in its energy saving mode or not, a terminal may need to perform certain measurements as elaborated on above.

One issue that may be encountered when the number of reference symbols is reduced (in some embodiments to an absolute minimum) is that a terminal needs to rely on fewer symbols per time unit for keeping in sync with the network node. Even though this may be feasible in many situations, it will typically hurt the terminal performance in terms of power consumption, especially for a terminal in DRX mode (i.e. idle mode with DRX enabled or active mode with DRX enabled).

When a terminal is located in a wireless communication system where at least one network node may be in one of two operational modes as described above, it may be an advantage for the terminal to know the current operational mode of the network node (for example to be able to perform any of the above example tasks as accurately and resource efficiently as possible).

Hence, there is a need for methods and apparatuses that enable a terminal to optimize its behavior in terms of reception scheduling depending on the current operational mode of the network node. It may also be beneficial for the terminal to be able to determine the current operational mode of the network node.

According to embodiment of the invention, the terminal may adapt its reception pattern in idle DRX mode and/or active DRX mode based on a current operational mode of the network node.

For instance, if the camping/serving cell is in its normal operational mode, the terminal may rely on receiving reference symbols in all (or at least a majority of the) sub-frames. Therefore, a short continuous reception time during each DRX cycle is sufficient and may be used. Having to turn the receiver on for only a short period is obviously advantageous to the power consumption and battery life time of the terminal.

If the camping/serving cell is in its energy saving mode, the terminal may need to rely only on the synchronization signals (e.g. to perform time and frequency synchronization to the cell) or at least on a very limited amount of reference symbols. Hence, another reception pattern is preferably used in each DRX cycle than when the cell is in normal operation mode. Typically, the total time the receiver is turned on during a DRX cycle is preferably larger when the cell is in energy saving mode. This may worsen the power consumption and battery life time of the terminal, but it may improve the cell search performance and/or avoid that the terminal loses its synchronization to the cell.

Thus, according to embodiments of the invention, a terminal may optimize the reception time (RX on time) based on a current operational mode of a network node. This may in turn minimize the power consumption of the terminal while still guaranteeing acceptable performance.

According to embodiments of the invention, a terminal may blindly detect a current operational mode of a network node.

One example way of achieving the blind detection of the current operational mode of a network node is to correlate a known signal pattern with a signal received from the network node and comparing correlation values with a particular correlation threshold. If a correlation value exceeds the threshold, it may be determined that the network node is in a particular operational mode (e.g. a normal operational mode), and if no correlation value exceeds the threshold, it may be determined that the network node is in another operational mode (e.g. an energy saving operational mode). The known signal pattern may be defined by the cell identity and may comprise a signal that is only transmitted if the network node is in its normal operational mode (e.g. reference symbols).

In the above example of correlation with a reference signal, there may be variants of energy saving modes that do transmit the reference signal but only to a limited extent (e.g. at certain time and/or frequency positions). In such situations, the correlation may be performed for positions where the reference symbols are not transmitted for the energy saving mode.

Another example way of achieving the blind detection of the current operational mode of a network node is to attempt to decode some specific broadcast information of a received signal. If the decoding attempt is successful it may be determined that the network node is in a particular operational mode (e.g. a normal operational mode), and if the decoding attempt is not successful, it may be determined that the network node is in another operational mode (e.g. an energy saving operational mode). The specific broadcast information may comprise a signal that is only transmitted if the network node is in its normal operational mode.

According to some embodiments, there may be several definitions of the "idle" state of a network node specified. For example, there may be several ways of organizing transmitted signals/channels to save energy. In such embodiments, a terminal may be able to also blindly detect the current "idle" state type using methods similar to those described above.

According to some embodiments, the network signals an indication of the current operational mode of a network node to the terminal.

Thus, according to embodiments of the invention, the terminal is able to determine the operational mode (normal operation mode or energy saving mode) of a network node. It is to be noted that embodiments of the invention enables the terminal to determine the current operational mode of one or more camping/serving cells, but also allows the terminal to determine the current operational mode of neighboring cells (i.e. non-camping/serving cells).

The gained knowledge regarding the current operational mode of the network node may be used to adapt the reception pattern of the terminal in DRX mode.

FIG. 1A illustrates an example method 100 that may be performed by a terminal according to some embodiments of the invention. In step 110, the terminal detects a new cell. Typically, a cell is detected using cell search procedures well known in the art. The detection of a cell typically involves acquiring an identifier (cell ID) for the cell.

In step 120, the terminal determines the current operational mode of the cell. This may be achieved in numerous ways, and the precise implementation of step 120 is not to be construed as limiting to the invention. In general it is assumed that the terminal is either already aware of the current operational mode of the cell or has possibilities to gain that knowledge. In some embodiments, the determination may comprise blind detection of the current operational mode and/or reception of an indication of the current operational mode.

In step 130, the terminal adapts the reception pattern of the terminal in DRX mode based on the knowledge gained in step 120.

The terminal may store the current operational mode of one or more of the cells. For example, the terminal may store the current mode of all camping/serving cells. Furthermore, the terminal may store the current mode of all cells in a list of monitored cells.

FIG. 1B illustrates an example sub-method that may be performed as part of method step 130 of FIG. 1A.

The information regarding current operational mode of a camping/serving cell may be used in the following way (using UMTS LTE as an example).

If the mode is a normal operation mode (NO-path out of step 131), the terminal may use a "normal" time pattern for turning on the receiver in DRX mode (in step 133).

If the mode is an energy saving operation mode (YES-path out of step 131), the terminal may generally have to rely on a more scarce set of signals as has been exemplified above. Therefore, the terminal may use an adapted "idle" time pattern for turning on the receiver in DRX mode (in step 132).

FIG. 2 illustrates some example time periods that may be used to determine when the receiver of the terminal is turned on in DRX mode according to some embodiments of the invention.

Transmission by the network node in energy saving mode of synchronization signals (PSS/SSS in sub-frames 0 and 5) is indicated by reference number 210. The time periods for transmission of possible pages to an idle terminal by the network node are indicated by reference number 220. It is noted that the time periods 220 for transmission of possible pages are merely an example. Correspondingly, any downlink transmission to a terminal may have a related time period in which a possible transmission takes place. For example, a terminal in active (e.g. connected) mode may receive data, and time periods for transmission of the data by the network node may be defined in the same manner or similarly as the time periods 220 for transmitting possible pages.

FIG. 2 further illustrates a number of example schemes or time patterns 230, 240, 250 for turning on the receiver of the terminal in DRX mode depending on the current operational mode of a network node.

Reference number 230 indicates an example scheme for turning on the receiver of the terminal in DRX mode if the network node is in its normal operation mode. As may be seen the receiver is turned on in this example during a time period of a certain length 231 in each DRX cycle. The RX on time period comprises at least the time period for transmission of possible pages (or of any other applicable downlink transmission). The scheme 230 may, for example, be applied in method step 133 of FIG. 1B.

When a serving/camping cell is in normal operation, the terminal may typically be able to utilize reference symbols transmitted in (at least a majority) of the sub-frames for time and frequency synchronization. Thus, the length of the time period 231 may be relatively short. In some embodiments, the receiver is turned on for a continuous time period as illustrated in the scheme 230. The length 231 of the time period may, for example, be smaller than a threshold. The threshold may have a pre-determined value (e.g. from a standard specification), may take a value signaled by the network, or may have a terminal implementation specific value.

Reference number 240 indicates an example scheme for turning on the receiver of the terminal in DRX mode if the network node is in its energy saving mode. As may be seen the receiver is turned on in this example during a time period of a certain length 241 in each DRX cycle. The RX on time period comprises at least the time period for transmission of possible pages (or of any other applicable downlink transmission), and is typically longer than the time period 231 used when the network node is in its normal operation mode. The scheme 240 may, for example, be applied in method step 132 of FIG. 1B.

Reference number 250 indicates an alternative example scheme for turning on the receiver of the terminal in DRX mode if the network node is in its energy saving mode. As may be seen the receiver is turned on in this example during a time period of a certain length 251 in each DRX cycle. However, the receiver is not continuously turned on during this time period, but is turned on and off during the time period according to a certain sub-pattern. The receiver should preferably be turned on at least during the time period for transmission of possible pages (or of any other applicable downlink transmission). Typically, the length 251 of the time period comprising the discontinuous sub-pattern is longer than the time period 231 used when the network node is in its normal operation mode. The scheme 250 may, for example, be applied in method step 132 of FIG. 1B.

When a serving/camping cell is in energy saving mode, the terminal may typically need to rely on synchronization signals and/or reference symbols transmitted only in a few sub-frames (see for example 210). Furthermore, the reference symbols may be transmitted over a narrower bandwidth (e.g. the same bandwidth as the synchronization signals—6 central resource blocks). Hence, there are fewer opportunities for performing measurements and similar tasks. Thus, to guarantee adequate functionality, the time periods during which the receiver of the terminal is turned on need to be adapted (e.g. as in schemes 240 or 250) to the conditions resulting from the energy saving mode of the network node. Adequate functionality may, for example, refer to detection of synchronization status (in-sync or out-of-sync) and/or measurements on serving/camping cells and/or on neighboring cells (e.g. monitored cells). Such measurements may include signal strength and/or signal quality measurements. More generally, examples of adequate functionality may include monitoring a quality of a downlink radio link, automatic frequency control, mobility measurements, positioning measurements for determination of terminal location, time synchronization, and frequency synchronization.

In the example schemes 240 and 250, the lengths of the time periods 241 and 251 are longer than the length of the time period 231 used for normal network node operation.

This ensures that a sufficient amount of synchronization signals and/or reference symbols may be received so that the terminal may perform its task adequately. In some embodiments, the receiver is turned on for a continuous time period as illustrated in the scheme 240. In some embodiments, the receiver is not turned on for a continuous time period but rather during shorter intervals within the total time period as illustrated in the scheme 250. The latter may improve the power consumption of the terminal since the total time the receiver is turned on is reduced. Preferably, the discontinuous time sub-pattern of scheme 250 is adjusted so that the receiver is turned on at least during the time period of possible pages in idle mode, during the time periods for reception of other applicable downlink transmissions in e.g. active/connected mode, and during the time periods for transmission of synchronization signals and/or reference symbols (compare 250 with 220 and 210). The lengths 241 and 251 of the time periods may, for example, be larger than a threshold. The thresholds, the discontinuous time sub-pattern, and/or other parameters related to the receiving schemes may be predetermined (e.g. in a standard specification), may take a form signaled by the network, or may be specific to the terminal implementation. The threshold is typically larger than or equal to the threshold value associated with the length 231.

With reference to FIG. 2, a number of example schemes or time patterns 230, 240, 250 for turning on the receiver of the terminal in DRX mode depending on the current operational mode of a network node have been illustrated. The examples of FIG. 2 are applicable for a terminal in idle mode (with DRX enabled). When a terminal is in active/connected mode (with DRX enabled) similar approaches may be applicable to determine suitable schemes or time patterns for turning on the receiver of the terminal in DRX mode depending on the current operational mode of a network node. While the receiver of a terminal in idle mode should preferably be turned on during paging periods, the receiver of a terminal in active/connected mode should preferably be turned no during reception periods of each DRX cycle.

FIG. 3 is a schematic drawing illustrating a computer readable medium in the form of a CD-ROM 300 according to some embodiments of the invention. The CD-ROM 300 may have stored thereon a computer program comprising program instructions. The computer program may be loadable (as shown by arrow 310) into an electronic device 320 comprising a processing unit 340 and possibly a separate memory unit 330. When loaded into the electronic device 320, the computer program may be stored in the memory unit 330. According to some embodiments, the computer program may, when loaded into the electronic device 320 and run by the processing unit 340, cause the electronic device 320 to execute method steps according to, for example, the method shown in FIGS. 1A-B. The electronic device 320 may, for example be a communication device or a component of a communication device, wherein the communication device is a portable or handheld mobile radio communication equipment, a mobile radio terminal, a mobile telephone, a communicator, an electronic organizer, a smartphone, a computer, a notebook, or a mobile gaming device.

Figure 4:
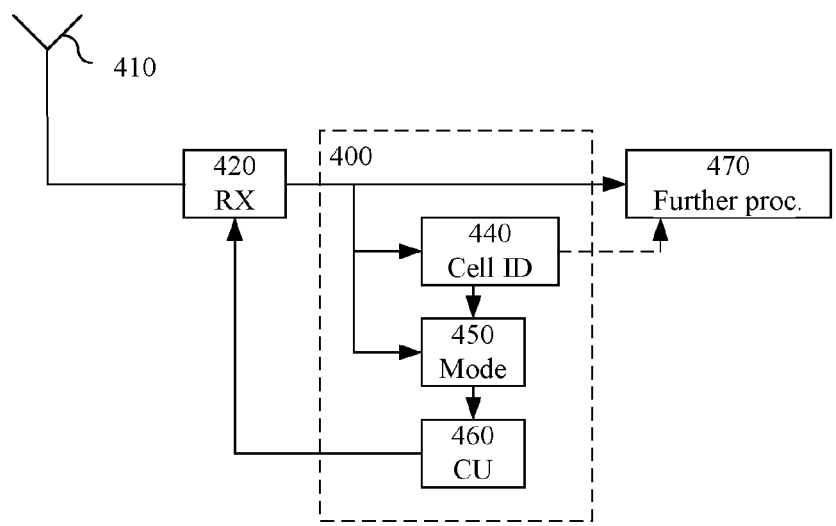
FIG. 4 is a block diagram illustrating an example arrangement according to some embodiments of the invention.

FIG. 4 illustrates an example arrangement 400 according to some embodiments of the invention.

The arrangement 400 comprises a cell identifier 440, which may, for example, be adapted to perform method step 110 as described in connection with FIG. 1A. The arrangement 400 also comprises an operational mode detector 450, which may, for example, be adapted to perform method step 120 as described in connection with FIG. 1A. Furthermore, the arrangement 400 comprises a controller 460, which may, for example, be adapted to perform method step 130 as described in connection with FIG. 1A.

The cell identifier 440 and the operational mode detector 450 are arranged to receive signals from a receiver 420, which in turn is connected to one or more antennas 410. The received signal is also forwarded to other processing 470 not directly relevant to the description of embodiments of the invention.

The cell identifier 440 is arranged to supply information relating to the cell identity (e.g. reference signal pattern, scrambling codes, etc) to the operational mode detector 450. The operational mode detector 450 is arranged to forward a detected current operational mode to the controller (CU) 460.

The controller 460 may be arranged to store the detected operational mode in a memory (not shown) and/or to adapt the time pattern during which the receiver 420 is turned on in DRX mode based on the operational mode. The adaptation may, for example, be according to what has been described in connection to FIG. 2 and step 130 of FIG. 1A.

In some embodiments, functional blocks that already exist in the further processing block 470 may be re-used in the arrangement 400. This may, for example, apply to the controller 460 and/or the cell identifier 440.

Figure 5:
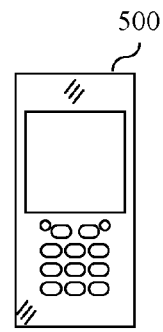
FIG. 5 is a schematic drawing illustrating a mobile terminal which may comprise an arrangement according to some embodiments of the invention.

FIG. 5 illustrates an example mobile terminal 500, illustrated as a mobile telephone in a schematic front view.

The example mobile terminal 500 is adapted to connect to a mobile telecommunication network via a wireless link to a radio base station. The mobile terminal may, for example, comprise an arrangement as described in connection to FIG. 4 and/or perform the method as described in connection to FIGS. 1A-B.

Embodiments of the invention have now been described in which adaptation of a terminal receiver activity pattern is performed based on a current operational mode of a serving/camping cell. However, it should be emphasized that embodiments of the invention are equally applicable in a case where adaptation of a terminal receiver activity pattern is performed based on a current operational mode of a neighboring or monitored cell. This may, for example, be advantageous when performing neighbor cell measurements for mobility purposes.

According to some embodiments, there may be several definitions of the "idle" state of a network node specified. For example, there may be several ways of organizing transmitted signals/channels to save energy. In such embodiments, a terminal may be able to determine which energy saving mode the network node is currently in using methods similar to those described above. Furthermore, there may be different time patterns for turning on the terminal receiver, one for each of the operational modes. Alternatively, the same time pattern for turning on the terminal receiver may be applicable to two or more of the energy saving modes.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a communicator, an electronic organizer, a smartphone, a computer, a notebook, or a mobile gaming device.

According to some embodiments of the invention, a computer program product comprises a computer readable medium such as, for example, a diskette, a USB-stick or a CD-ROM (compare with FIG. 3). The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the method shown in FIGS. 1A-B.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of operating a terminal of a wireless communication network, wherein the terminal operates according to a discontinuous reception mode and the wireless communication network comprises one or more wireless network nodes having at least first and second downlink transmission modes, comprising:
detecting a cell identity for a cell associated with a wireless network node of the wireless communication system;
determining a current downlink transmission mode of the wireless network node as the first or second downlink transmission mode; and
adapting a time pattern based on the determined current downlink transmission mode, wherein the time pattern specifies when a receiver of the terminal is turned on, wherein:
the first downlink transmission mode comprises normal operation of a particular network node and is applicable when a number of active terminals in a cell associated with the particular network node is greater than a first mode threshold value, and the second downlink transmission mode comprises restricted downlink transmission of the particular network node and is applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network.

2. The method of claim 1, wherein the step of adapting the time pattern based on the determined current downlink transmission mode comprises using, for the first downlink transmission mode, a periodically repeated first continuous receiver on period comprising a paging period if the terminal is in an idle mode and a reception period if the terminal is in an active mode, wherein the length of the first continuous receiver on period is smaller than a first period length threshold value.

3. The method of claim 2, wherein the step of adapting the time pattern based on the determined current downlink transmission mode comprises using, for the second downlink transmission mode, a periodically repeated second continuous receiver on period comprising the paging period if the terminal is in an idle mode and a reception period if the terminal is in an active mode, wherein the length of the second continuous receiver on period is larger than a second period length threshold value.

4. The method of claim 2, wherein the step of adapting the time pattern based on the determined current downlink transmission mode comprises using, for the second downlink transmission mode, a periodically repeated discontinuous receiver on pattern having a specific duration, wherein the length of the specific duration is larger than a second period length threshold value, and wherein the discontinuous receiver on pattern comprises a receiver on period comprising the paging period if the terminal is in an idle mode and a reception period if the terminal is in an active mode.

5. The method of claim 3, wherein the second period length threshold value is larger than or equal to the first period length threshold value.

6. The method of claim 1, wherein the step of determining the current downlink transmission mode comprises receiving an indication of the current downlink transmission mode from the wireless communication network.

7. The method of claim 1, wherein the step of determining the current downlink transmission mode comprises blindly detecting the current downlink transmission mode.

8. The method of claim 1, wherein the second operation mode comprises transmission of a synchronization signal and wherein the time pattern is suitable for using the synchronization signal for at least one of:
monitoring a quality of a downlink radio link;
automatic frequency control;
mobility measurements;
positioning measurements for determination of terminal location;
time synchronization; and
frequency synchronization.

9. The method of claim 1, wherein the second operation mode comprises intermittent downlink transmission of the particular network node.

10. The method of claim 1, wherein at least one of the first and second threshold values equals zero.

11. The method of claim 1, wherein the time pattern is:
terminal specific; or
predefined.

12. The method of claim 1, wherein at least one of the time pattern and an identifier of a predefined time pattern is signalled by the network node.

13. A nontransitory computer readable medium, having thereon a computer program comprising program instructions, the computer program being loadable into a data-processing unit of a terminal of a wireless communication network, wherein the terminal operates according to a discontinuous reception mode and the wireless communication network comprises one or more wireless network nodes having at least first and second downlink transmission modes,
the computer program being adapted to cause the data-processing unit to execute at least the following steps when the computer program is run by the data-processing unit:
detecting a cell identity for a cell associated with a wireless network node of the wireless communication system;
determining a current downlink transmission mode of the wireless network node as the first or second downlink transmission mode; and
adapting a time pattern based on the determined current downlink transmission mode, wherein the time pattern specifies when a receiver of the terminal is turned on,
wherein:
the first downlink transmission mode comprises normal operation of a particular network node and is applicable when a number of active terminals in a cell associated with the particular network node is greater than a first mode threshold value, and
the second downlink transmission mode comprises restricted downlink transmission of the particular network node and is applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network.

14. An arrangement for a terminal of a wireless communication network, wherein the terminal operates according to a discontinuous reception mode and the wireless communication network comprises one or more wireless network nodes having at least first and second downlink transmission modes, comprising:
a cell identity detector arranged to detect a cell identity for a cell associated with a wireless network node of the wireless communication system;
a transmission mode determiner arranged to determine a current downlink transmission mode of the wireless network node as the first or second downlink transmission mode; and
a controller arranged to adapt a time pattern based on the determined current downlink transmission mode, wherein the time pattern specifies when a receiver of the terminal is turned on,
wherein:
the first downlink transmission mode comprises normal operation of a particular network node and is applicable when a number of active terminals in a cell associated with the particular network node is greater than a first mode threshold value, and
the second downlink transmission mode comprises restricted downlink transmission of the particular network node and is applicable when the number of active terminals in the cell associated with the particular network node is less than or equal to a second mode threshold value, the restricted downlink transmission comprising information that assists active terminals not served by the cell in finding the cell and/or non-active terminals camping on the cell to stay in synchronization with the wireless communication network.

15. The arrangement of claim 14, further comprising a receiver arranged to receive an indication of the current downlink transmission mode from the wireless communication network.

16. A communication device comprising the arrangement according to claim 14.

* * * * *